US012225251B2

(12) United States Patent
Vetter et al.

(10) Patent No.: US 12,225,251 B2
(45) Date of Patent: Feb. 11, 2025

(54) RETURN PATH FOR BROADCAST SYSTEM AND METHOD

(71) Applicant: Trilogy 5G, Inc., Irving, TX (US)

(72) Inventors: John Vetter, Irving, TX (US); Imran Syed, Irving, TX (US)

(73) Assignee: Trilogy 5G, Inc., Irving, TX (US)

( * ) Notice: Subject to any disclaimer, the term of this patent is extended or adjusted under 35 U.S.C. 154(b) by 0 days.

(21) Appl. No.: 18/137,655

(22) Filed: Apr. 21, 2023

(65) Prior Publication Data

US 2023/0345060 A1    Oct. 26, 2023

Related U.S. Application Data

(60) Provisional application No. 63/333,945, filed on Apr. 22, 2022.

(51) Int. Cl.
*H04N 21/235* (2011.01)
*H04N 7/173* (2011.01)
*H04N 21/643* (2011.01)

(52) U.S. Cl.
CPC ....... *H04N 21/235* (2013.01); *H04N 7/17318* (2013.01); *H04N 21/64322* (2013.01)

(58) Field of Classification Search
CPC ............. H04N 21/235; H04N 7/17318; H04N 21/64322; H04N 21/6112; H04N 21/6583; H04L 12/2801
See application file for complete search history.

(56) References Cited

U.S. PATENT DOCUMENTS

| | | | |
|---|---|---|---|
| 9,038,159 B2 | 5/2015 | Koonjbearry et al. | |
| 10,439,683 B1 | 10/2019 | Baumgartner et al. | |
| 10,652,624 B2 | 5/2020 | Simon et al. | |
| 10,652,849 B2 | 5/2020 | Simon | |
| 10,951,334 B2 | 3/2021 | Simon et al. | |
| 2010/0037270 A1* | 2/2010 | Bennett | H04N 7/16 |
| 2012/0072933 A1 | 3/2012 | Moore | |
| 2012/0236779 A1 | 9/2012 | Lee et al. | |

(Continued)

FOREIGN PATENT DOCUMENTS

WO    WO 2021/101934 A1    5/2021

OTHER PUBLICATIONS

Advanced Television Systems Committee, "ATSC Standard: ATSC 3.0 System" Doc. A/300:2022-04, Apr. 8, 2022, Washington D.C., 31 pages.

(Continued)

*Primary Examiner* — Anthony Bantamoi
(74) *Attorney, Agent, or Firm* — Manatt, Phelps & Phillips, LLP

(57) ABSTRACT

A broadcast system may have an out of band return path and the out of band return path may be used for communications with digital services provided by the broadcast system. For example, the broadcast system may provide a file transfer digital service to a user of the broadcast system and the out of band return path may be used to communicate acknowledgments back to the broadcast system during a file transfer process. In one implementation, the broadcast system may be an Advanced Television Systems Committee (ATSC) 3.0 television broadcast system. A method for using the out of band return path to interact with the digital service is disclosed.

16 Claims, 3 Drawing Sheets

(56) References Cited

U.S. PATENT DOCUMENTS

| | | |
|---|---|---|
| 2013/0263198 A1 | 10/2013 | Garriga |
| 2015/0222942 A1 | 8/2015 | Ge et al. |
| 2016/0212626 A1 | 7/2016 | Simon et al. |
| 2018/0098132 A1 | 4/2018 | Aitken et al. |
| 2019/0268777 A1 | 8/2019 | Simon et al. |
| 2020/0014522 A1 | 1/2020 | Simon |
| 2020/0178121 A1 | 6/2020 | Simon et al. |
| 2020/0221186 A1* | 7/2020 | Shambro .......... H04N 21/64707 |
| 2021/0074276 A1 | 3/2021 | Miller et al. |

OTHER PUBLICATIONS

Advanced Television Systems Committee, "ATSC Standard: Dedicated Return Channel for ATSC 3.0" Doc. A/323:2022-03, Mar. 31, 2022, Washington D.C., 74 pages.

Simon, Michael, et al., ATSC 3.0 Broadcast 5G Unicast Heterogeneous Network Converged Services Starting Release 16, 2020 IEEE Transactions On Broadcasting, 10 pages.

ETSI, Technical Specification "5G Broadcast System for linear TV and radio services; LTE-based 5G terrestrial broadcast system" ETSI 2020, European Broadcasting Union 2020, 44 pages.

Jon Montalban et al., 'Broadcast core-network: Converging broadcasting with the connected world', In: IEEE Transactions on Broadcasting, Aug. 2021, pp. 1-2.

\* cited by examiner

RETURN PATH FOR BROADCAST SYSTEM AND METHOD

PRIORITY CLAIMS/RELATED APPLICATIONS

This application claims the benefit under 35 USC 119(e) and claims priority under 35 USC 120 to U.S. Provisional Patent Application No. 63/333,945 filed on Apr. 22, 2022, the entirety of which is incorporated herein by reference.

FIELD

The disclosure relates to a system and method that provides a return path for a broadcasting system.

BACKGROUND

The Advanced Television Systems Committee (ATSC) has been promulgating standards for broadcast systems for a long time. Recently, ATCS promulgated a new standard (ATSC 3.0) that combines the typical broadcast data (the broadcasting of the same data to a plurality of televisions for example) with two way digital data, such as provided in the 5G standard. With a system that implements the ATSC 3.0 standard, a single broadcaster can emit a signal that broadcasts high resolution data for a large-screen TV on the wall at the same time that the system can be for data associated with a mobile device. According to ATSC, the ATSC 3.0 system converges broadcast and broadband, solving some of the problems that even 5G can't solve in the conventional cell provider world and the ATSC 3.0 standard speaks to the Internet of Things (IoT) and to the need for high speed, ultra-reliable lifeline communications for emergency alerts.

A return path for acknowledgments are well known in typical digital data systems or cellular data systems that both upload and download data from the mobile device to the backend and vice versa. However, prior to ATSC 3.0, most broadcasting type systems did not have any return path since there was only one way communications from the broadcast system to a plurality of televisions. The ATSC 3.0 standard (document A/323 for "Dedicated Return Path for ATSC 3.0 from ATSC that is incorporated herein by reference) includes a dedicated return path to support interactive services without dependence on other non-ATSC 3.0 network infrastructures. In most current implementations for ATSC 3.0, it is contemplated that spare bandwidth in the ATSC broadcast television signal may be used. However, such an implementation is not practical since current television sets are too slow and do not have a sufficient antenna to return the data for the interactive services. Furthermore, these return paths could not be used for other digital data such as file transfers. Thus, it is desirable to provide a return path for broadcast systems that use other network infrastructure and can be used to effectively return acknowledgements for digital data activities such as file transfer and it is to this end that the disclosure is directed.

DETAILED DESCRIPTION OF ONE OR MORE EMBODIMENTS

The disclosure is particularly applicable to an ATSC 3.0 broadcast system and an out of band return path that may be used for acknowledgments in a file transfer process and it is in this context that the disclosure will be described. It will be appreciated, however, that the system and method has greater utility since the out of band return path can be used for other processes in which it is desirable to be able to communicate from a client device back to the broadcast system. Furthermore, the out of band return path system and method may be used with other existing or yet to be developed broadcast systems such as the 5G Broadcasting. Furthermore, the return path can any data path back for direct internet access (DIA) to assigned IP address(es) through the connected end user/customer device, such as wireline (fiber to the "x" (FTTx), digital subscribe line (DSL), Cable, ethernet) and/or wireless (Cellular, PCS, advanced wireless service (AWS), educational broadband service (EBS), citizen band radio service (CBRS), television whitespace (TVWS), fixed wireless access (FWA), LTE, 5G, future 3GPP standards, pLTE, standard wireless, proprietary licensed or unlicensed spectrum, microwave, satellite, WiFi, SCADA, LoRaWan, IoT, Cellular Modem, Industry 4.0, Bluetooth and/or Zigbee.)

Figure 1:
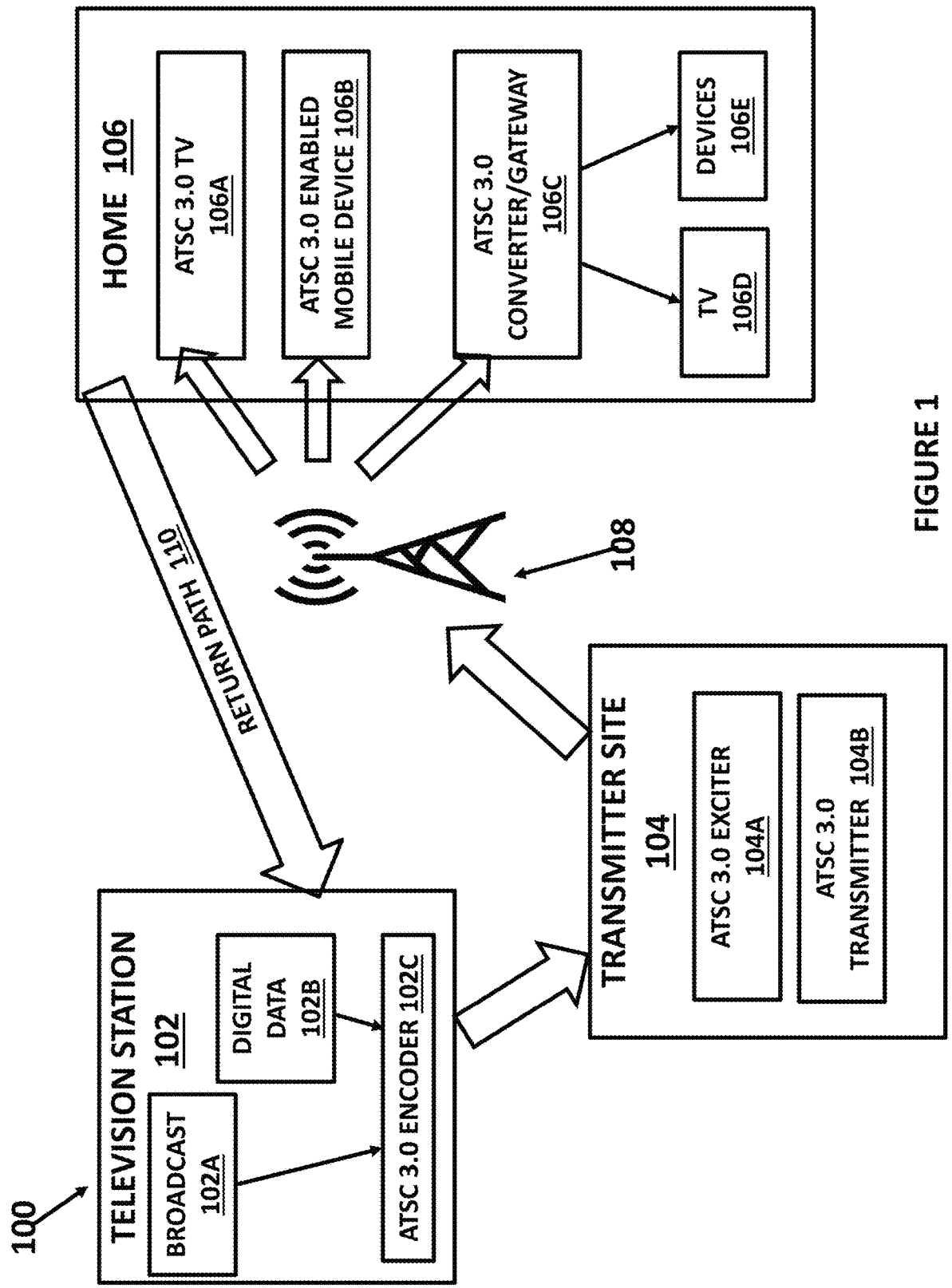
FIG. 1 is an example of an ATSC 3.0 broadcast system that has an out of band return path.

FIG. 1 is an example of an ATSC 3.0 broadcast system 100 that has an out of band return path that can be used as a return channel for digital services that are part of the ATSC 3.0 system. The system 100 may have one or more television stations 102 (a single TV station in shown in FIG. 1 for clarity) that sends ATSC 3.0 encoded data to a transmitter site and/or complimentary SFNs (single frequency network) associated with it or which could be a main transmitter or SFN(s) 104 and send that ATSC 3.0 encoded data using an antenna 108 to a residence 106 that has one or more customer premise devices (CPD) that consume the ATSC 3.0 encoded data. In one merely illustrative example, the out of band return path may be used for acknowledgments for a file transfer. The television station 102 may be a system comprises of a plurality of server computers that each have at least one processor that executes instructions to perform various operations and processes associated with the TV station 102. The TV station may have a source of broadcast material 102A, such as a database and database management system, that stores and outputs the content to be broadcast, usually based on a playlist. For example, the piece of content could be a sitcom, sporting event, a news show, advertisements, etc. The TV station may also have a digital data system 102B that may store digital data and include and manage the digital services, such as a file transfer, being provided by the TV station or a third party. The TV station may combine the broadcast data and digital data using a ATSC 3.0 encoder 102C into a stream of data packets that may be sent to the transmitter site 104.

The transmitter site 104 may be implemented as a plurality of server computers that each have at least one processor that executes instructions to perform various operations and processes associated with the transmitter site 104. For example, the transmitter site 104 may have an ATSC 3.0 exciter 104A that generates the signals that are sent to the antenna 108 by a transmitter 104B.

The residence/company/building 16 may receive the broadcast data from the TV station 102 that may include the television (TV) broadcast data and data for the digital services. The broadcast data may be sent to the various data consuming customer devices, such as a ATSC 3.0 enabled TV 106A, an ATSC 3.0 enabled mobile device 106B (that may be a tablet computer, a personal computer, a smartphone device, etc.) and an ATSC 3.0 TV receiver/converter/gateway 106C that may allow consumer devices that are not compliant with ATSC 3.0 to function with the ATSC 3.0 data. For example, the converter 106C may allow a TV 106D or other devices 106E to still consume the broadcast data and/or digital services in the broadcast.

The system may also have an out of band return path 110 that provides the device(s) in the residence/business/building 106 with a path to send data back to the TV station or third parties that provide the digital services. Unlike the ATSC 3.0 standard that envisions an in-band return channel that may be technically infeasible for the reasons above, the system provide an out of band return path 110. For example, in one use case, the return path may be used for acknowledgments in digital services, such as acknowledgments (ACKs) during a file transfer digital service. The return path 100 may carry ACKs along with any pertinent information, signal quality, file size, date/time, etc. using the ATSC 3.0 Datacasting or Multicasting method allowed in ATSC 3.0 protocol. The return path 110 may be any path back using direct internet access (DIA) most likely to assigned IP address(es) of the digital service provider from the connected end user/customer device(s) 106A-106E, For example, the return path 110 may be wireline (FTTx, DSL, Cable, ethernet) and/or wireless (Cellular, PCS, AWS, EBS, CBRS, television whitespace (TVWS), FWA (Fixed Wireless Access), LTE, 5G, future 3GPP standards, pLTE, standard wireless, proprietary licensed or unlicensed spectrum, microwave, satellite, WiFi, SCADA, LoRaWan, IoT, Cellular Modem, Industry 4.0, Bluetooth and/or Zigbee).

Figure 2:
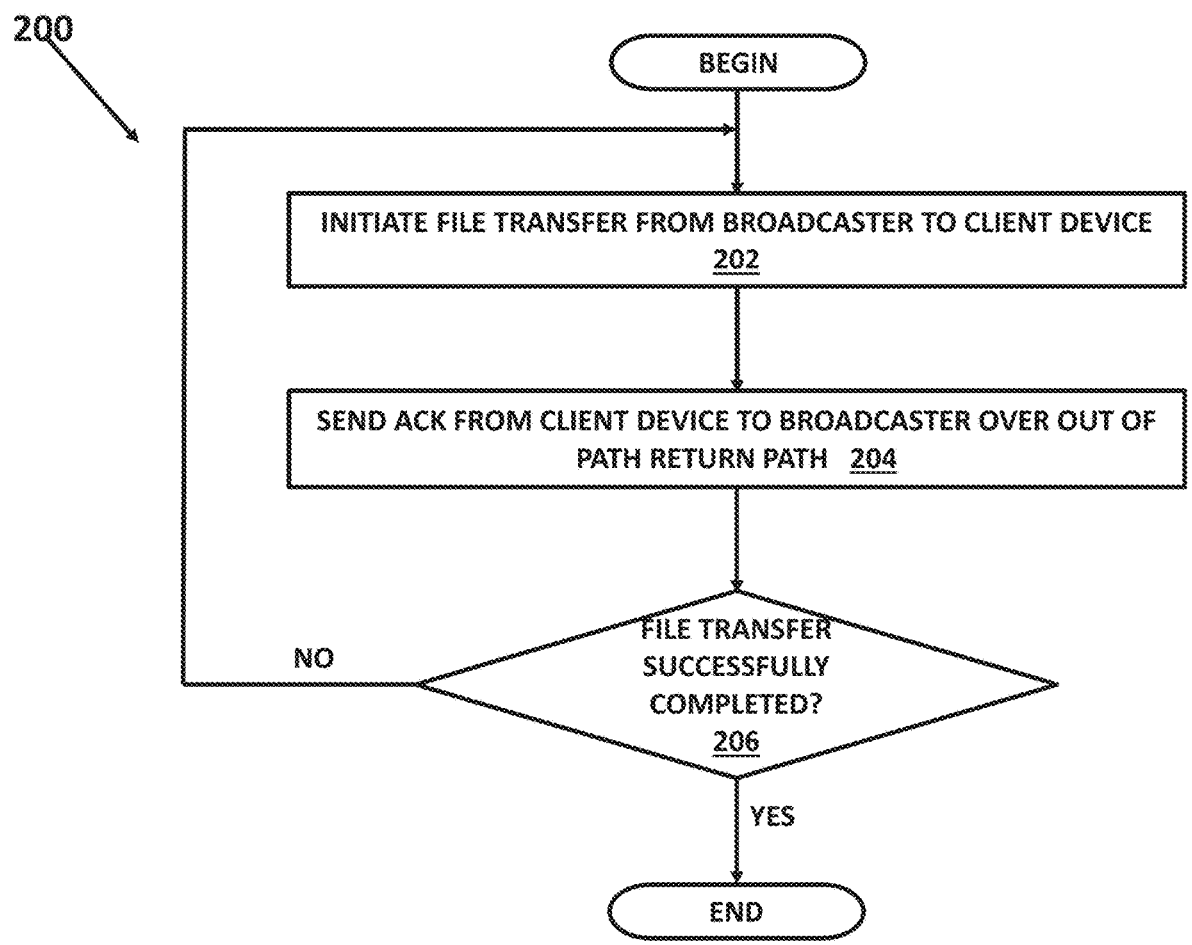
FIG. 2 is a flowchart of a method for file transfer in a broadcast system using the out of band return path.

FIG. 2 is a flowchart of a method 200 for file transfer in a broadcast system using the out of band return path. The file transfer is an example of a digital service that may be provided by the broadcast system and the acknowledgement discussed for the file transfer is an example of a response from the device consuming the digital service to the broadcast system. In one implementation, the broadcast system may be the ATSC 3.0 architecture television broadcast system. The file transfer may be performed using the broadcast system with the out of band return path shown in FIG. 1, but could also be performed using other systems and methods. In the method 200, a file transfer is initiated (202) from the broadcaster/digital services provider to a device in the residence/business/building 106 that requested the file transfer. Most file transfer protocols require periodic acknowledgments during the transfer or an acknowledgment when the transfer is finished to ensure that the file transfer was successful and did not fail due to network issues, etc. Thus, using the return path, the device can return acknowledgment data (that may, in one embodiment include an acknowledgement and data about the transfer as discussed above) (204) to the digital service provided that is performing the file transfer. Using the ACK, the method determines if the file transfer was successfully completed (206) and loops back to re-initiate the file process (or transfer of certain packets) if the file transfer was not successful. Note that a similar response process by the at least one device consuming the digital service may be performed for other digital services.

Figure 3:
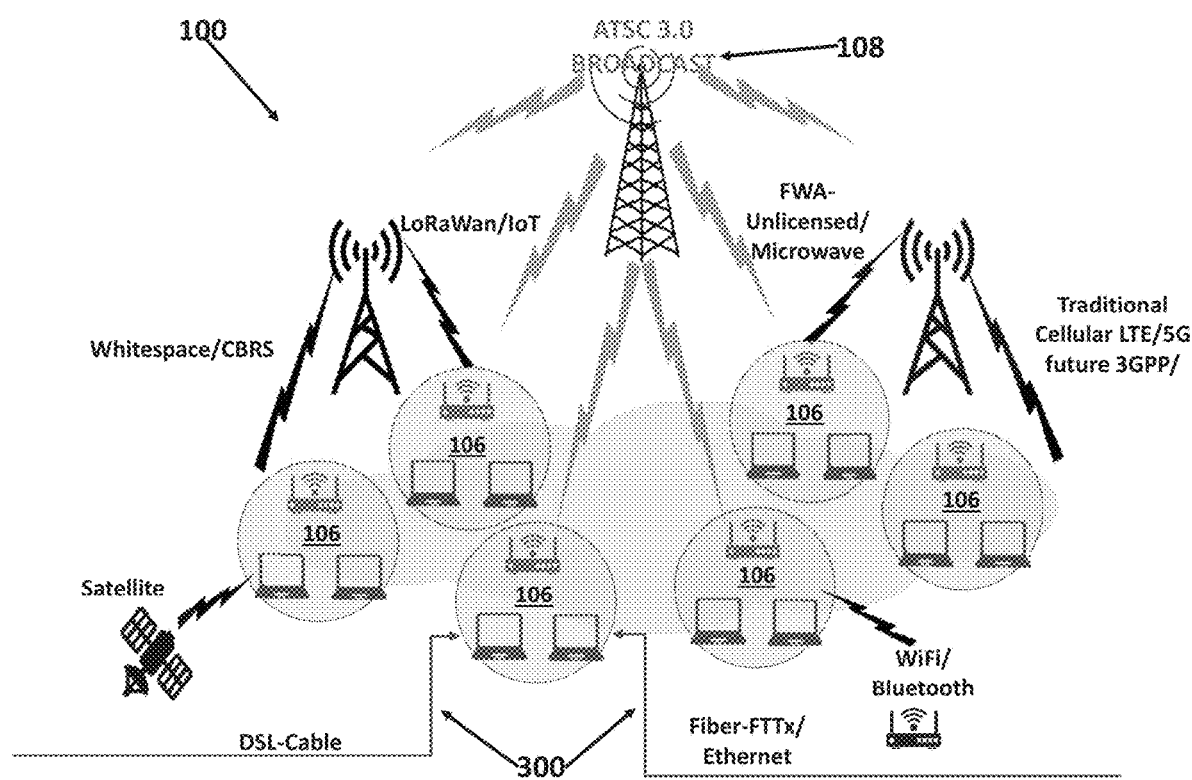
FIG. 3 illustrates more details of the out of band return paths for the broadcast system in FIG. 1.

FIG. 3 illustrates more details of the out of band return paths for the broadcast system in FIG. 1. As shown in FIG. 3, each of the possible out of band return paths have their own infrastructure that does not rely on the ATSC 3.0 infrastructure that is used for the dedicated return ATSC 3.0 channel. While each return path type shown in FIG. 3 is shown connecting to a discrete number of residence/business/building 106, each return path could be connected to each residence/business/building 106. Furthermore, multiple different return paths (or all of the available return paths) may be connected to each residence/business/building 106 (which is not shown in FIG. 3). For each of the return paths, the available infrastructure for each return path may be already existing for a particular residence/business/building 106 or newly installed. Furthermore, the disclosed return path may be provided by data connections and infrastructures not shown in FIG. 3 that are separate from the ATSC 3.0 infrastructure.

As discussed above, the return path infrastructure may be wired 300 (examples being DSL and/or cable, fiber-FTTx or Ethernet) that connect to the residence/business/building 106 and that the known wired infrastructure. The return path also may be wireless such as satellite data communications through the available satellite infrastructure or WiFi or Bluetooth data communications through available WiFi or Bluetooth infrastructure. The wireless return path also may be whitespace/CBRS data communications through available whitespace/CBRS infrastructure or LoRaWan/IoT data communications through available LoRaWan/IoT infrastructure. The wireless return path also may be FWA-unlicensed or microwave data communications through available FWA-unlicensed or microwave infrastructure or cellular LTE, 5G or future 3GPP data communications through available cellular LTE, 5G or future 3GPP infrastructure.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A digital services system, comprising:
an Advanced Television System Committee (ATSC 3.0) a television broadcast system that broadcasts a signal to a plurality of devices;
each of the plurality of devices being configured to receive and consume the broadcast signal from the ATSC 3.0 television broadcast system;
the broadcast signal including a digital service and wherein at least one device is configured to consume the digital service;
a return path out of band from the ATSC 3.0 television broadcast system; and
wherein the at least one device further comprises a processor, memory and a plurality of lines of instructions executed by the processor so that the at least one device is configured to send an acknowledgement of receipt of the digital service over the out of band return path to the ATSC 3.0 television broadcast system.

2. The system of claim 1, wherein the ATSC 3.0 television broadcast system further comprises an encoder that combines the broadcast signal and the digital service into a stream of data packets and an antenna that broadcasts the stream of data packets to the plurality of devices.

3. The system of claim 1, wherein the television broadcast system further comprises an ATSC 3.0 television broadcast system.

4. The system of claim 3, wherein the out of band return path further comprises one of a wired return path and a wireless return path that connects to the at least one device.

5. The system of claim 4, wherein the wired return path is one of a digital subscriber line (DSL), a cable connection, a FTTx connection and an Ethernet connection, each of which connects to the at least one device.

6. The system of claim 4, wherein the wireless return path is one of a satellite data connection, a WiFi connection, a Bluetooth connection, a television whitespace (TVWS) connection, a citizen band radio system (CBRS) connection, a LoRaWan/IoT connection, an unlicensed data connection and a cellular connection.

7. The system of claim 3, wherein the at least one device further comprises one of an ATSC 3.0 enabled device and a device connected to an ATSC 3.0 gateway.

8. The system of claim 1, wherein the digital service is a file transfer from the ATSC 3.0 television broadcast system to the at least one device and wherein the at least one device is further configured to acknowledge the file transfer using the out of band return path.

9. The system of claim 1, wherein the digital service is a file transfer from the ATSC 3.0 broadcast television system to the at least one device and wherein the at least one device is further configured to send a series of acknowledgments of the file transfer during a file transfer process using the out of band return path.

10. The system of claim 9, wherein the at least one device is further configured to request the file transfer from the ATSC 3.0 broadcast television system.

11. A method for communicating using an broadcast television system for broadcast television digital services, the method comprising:
communicating data for a digital service from an Advanced Television System Committee (ATSC 3.0) a broadcast television system to a plurality of devices that are configured to receive the broadcast signal from the ATSC 3.0 broadcast television system;
sending, by at least one device that received the digital service from the ATSC 3.0 broadcast television system via the return path that is out of band from the ATSC 3.0 broadcast television system, a response from the at least one device back to the ATSC 3.0 broadcast television system; and
completing the digital service for the at least one device based on the sent response from the at least one device.

12. The method of claim 11, wherein the digital service is a file transfer from the ATSC 3.0 broadcast television system to the at least one device and the response from the at least one device is an acknowledgment of the file transfer sent over the out of band return path.

13. The method of claim 12, wherein communicating data for the digital service from the broadcast television system further comprises communicating the data for the digital service using an ATSC 3.0 architecture.

14. The method of claim 13, wherein sending a response from the at least one device further comprises one of sending a response over the out of band return path from an ATSC 3.0 enabled mobile device and sending a response over the out of band return path from a device that consumes digital services that is connected to an ATSC 3.0 gateway.

15. The method of claim 11, wherein the digital service is a file transfer from the ATSC 3.0 broadcast television system to the at least one device and the response from the at least one device is a series of acknowledgments of the file transfer during a file transfer process over the out of band return path.

16. The method of claim 15 further comprising requesting, by the at least one device, the file transfer from the ATSC 3.0 broadcast television system.

* * * * *